United States Patent [19]

Guynes

[11] 4,300,053
[45] Nov. 10, 1981

[54] ROTATABLE MOUNT FOR FILM CASSETTE

[76] Inventor: William L. Guynes, 208 Ritner St., Carson, Calif. 90746

[21] Appl. No.: 85,123

[22] Filed: Oct. 15, 1979

[51] Int. Cl.³ .............................................. G03B 41/16
[52] U.S. Cl. ................................................... 250/468
[58] Field of Search ........................ 250/468, 470, 471

[56] References Cited

U.S. PATENT DOCUMENTS

| 2,291,139 | 7/1942 | Borthwick | 250/468 |
|---|---|---|---|
| 2,919,625 | 1/1960 | Muller | 250/468 |
| 3,771,781 | 11/1973 | Lackey | 250/468 |

FOREIGN PATENT DOCUMENTS 2616926 10/1977 Fed. Rep. of Germany ...... 250/468

Primary Examiner—Craig E. Church
Attorney, Agent, or Firm—Smyth, Pavitt, Siegemund & Martella

[57] ABSTRACT

A rotatable cassette holder is disclosed which avoids the necessity of having to remove the cassette and grid from the cassette holder in order to reposition them in a different orientation. Prior art cassette holders were capable of holding the cassette and grid in only two orientations, and to change orientation necessitated removing the cassette and grid from the cassette holder, turning them, and inserting them back into the cassette holder. In this process the expensive and fragile grid was sometimes accidentally dropped and broken. To avoid this possibility inherent in the prior art cassette holders, the cassette holder of the present invention is rotatable to permit the cassette and grid to be reoriented without having to be removed from the cassette holder. In a preferred embodiment, the extent of the orientation is limited by stops and repeatable positioning is achieved by an indexing mechanism employing a detent.

1 Claim, 5 Drawing Figures

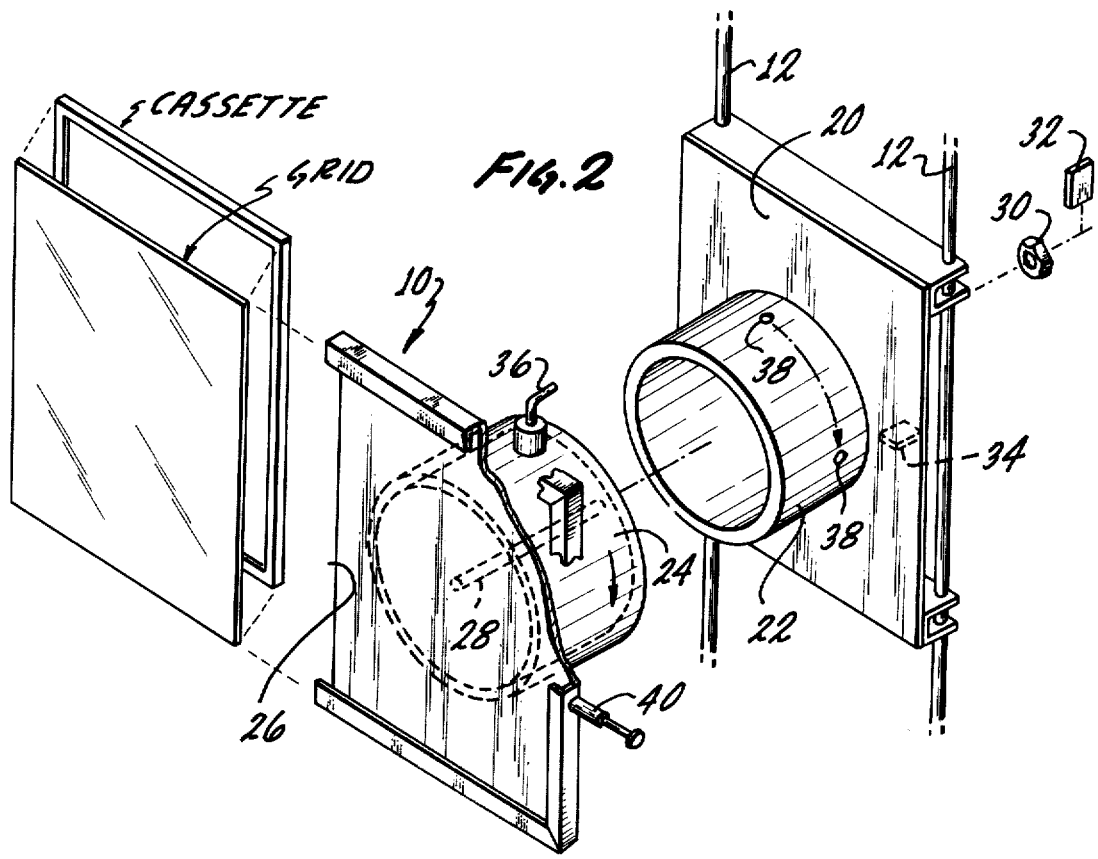
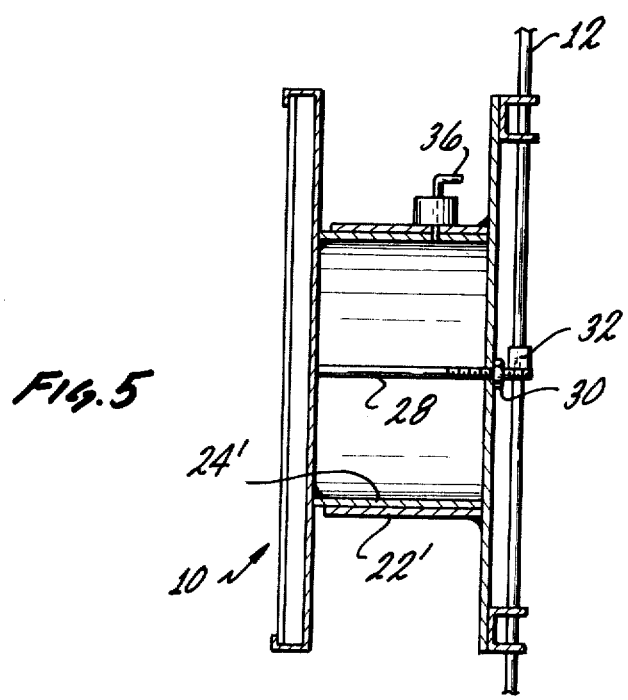

ROTATABLE MOUNT FOR FILM CASSETTE

BACKGROUND OF THE INVENTION

Apparatus for taking X-ray pictures of a standing human typically include two vertically-extending rails on which a cassette holder is movable to various positions at which the cassette holder can be locked. This permits the X-ray plate to be positioned at various height to accommodate people of different heights and to permit various parts of the body to be X-rayed.

A sheet of X-ray film is placed into a rigid picture-frame-like cassette which holds the X-ray plate flat and facilitates handling of the X-ray plate.

In practice, a device called a grid is normally positioned in the cassette holder immediately in front of the cassette. The grid typically includes a great number of very small baffles resembling the slats of a venetian blind, but far more delicate because they are formed of very thin sheets of lead. These very small and fragile strips serve to prevent stray X-radiation from entering the cassette, particularly at directions inclined to a normal to the plate.

Typically, the cassette holder includes a lower lip on which the lower edges of the cassette and of the grid are supported, and typically the upper edges of the cassette and of the grid are secured to the cassette holder by a clamp, which may be spring-loaded.

Once the cassette and the grid have been thus mounted in the cassette holder, they cannot be freely rotated with respect to the holder. After having thus mounted the cassette in the holder, the operator checks to make sure the picture will include all of the desired portions of the patient's body. Typically, the X-ray plate is rectangular in shape, and it is not unusual for the operator to decide that better coverage can be obtained by rotating the X-ray plate 90 degrees.

When the operator finds it necessary to reorient the plate, he must release the cassette and grid from the cassette holder, manually turn them 90 degrees, and then reinsert the cassette and grid once again into the cassette holder.

It occasionally happens that during this reorientation operation, the technician accidentally drops the expensive and fragile grid, and the grid is thereby destroyed. Such a grid might typically cost on the order of $600 today.

Thus, there exists a need for a simple and relatively inexpensive apparatus that can be used to prevent the grid from being dropped.

SUMMARY OF THE INVENTION

The above-described problem inherent in the prior art cassette holders is solved by the present invention, according to which a rotatable cassette holder is provided, in which the cassette and grid remain as the cassette holder is being rotated to a different orientation.

In a preferred embodiment of the present invention, a base is mounted on the vertically-extending rails to permit the cassette holder to be moved to various elevations at which it is clamped to prevent further motion. In the preferred embodiment of the invention, the base includes an axle extending generally horizontally, and defining a substantially horizontally-extending axis of rotation. The cassette holder is mounted for rotation on this axle by means of a hub which rotates on the axle. This permits the cassette holder to be rotated to any of a number of rotational positions, while the X-ray plate is maintained in a substantially vertical plane.

In a preferred embodiment, the cassette holder has the form of a flat box open at one end. The cassette and grid are inserted endwise into the cassette holder. Unless precautions are take, the cassette will fall out of the cassette holder if the open end of the cassette holder is rotated to face the floor. To protect against this possibility, stops are provided for limiting the rotational motion of the cassette holder with respect to the base. In a preferred embodiment, the open end of the cassette holder may be oriented only within plus and minus 90 degrees of a vertically upward position.

Practically all X-rays of the type to which the present invention relates are taken with the longer edge of the rectangular X-ray plate oriented either vertically or horizontally. Thus, in a preferred embodiment, an indexing mechanism is provided so that the vertical and horizontal orientations of the film can be repeatably obtained with a minimum of adjustment. In a preferred embodiment, a detent mechanism is used in which a spring-loaded member removably engages a hole in a second member.

The novel features which are believed to be characteristic of the invention, both as to organization and method of operation, together with further objects and advantages thereof will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 2 is a perspective view of an apparatus for holding an X-ray plate in accordance with a preferred embodiment of the present invention;

DETAILED DESCRIPTION OF THE PREFERRED EMBODIMENT

Figure 1:
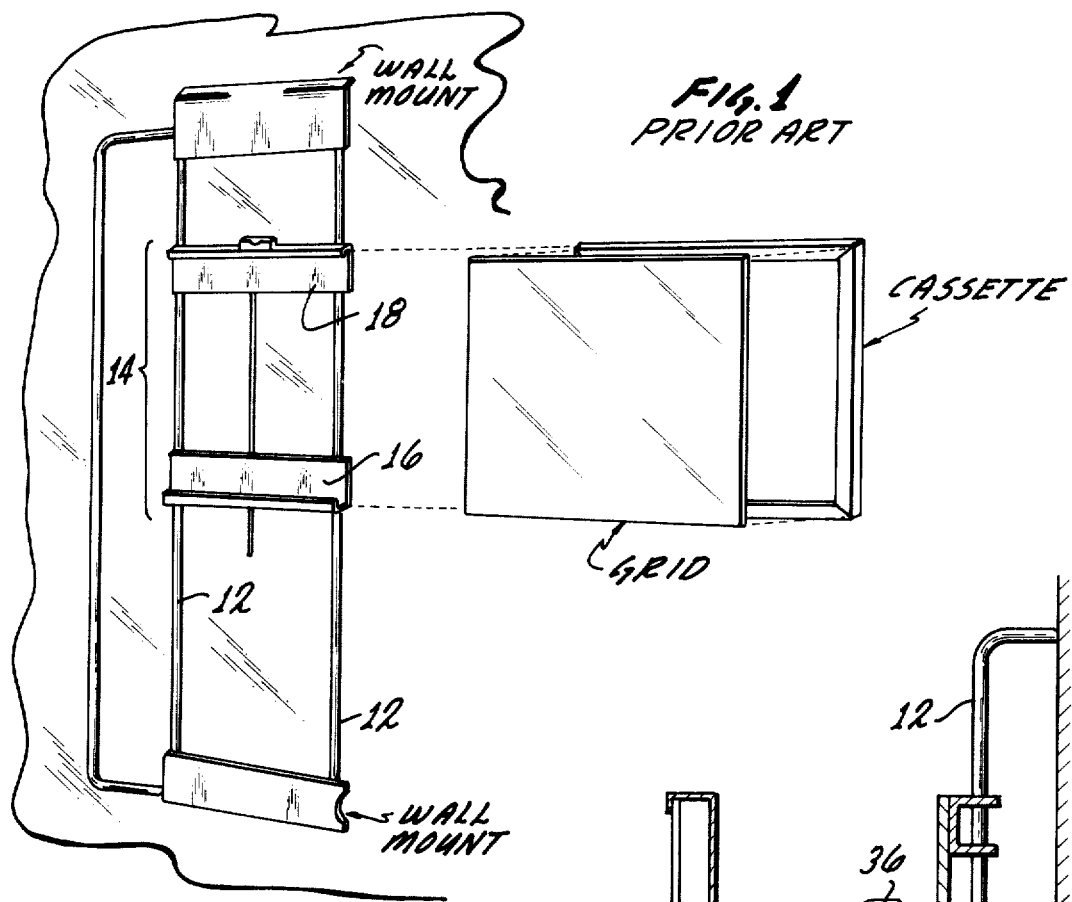
FIG. 1 is a perspective view of a prior art apparatus for holding an X-ray plate in a chosen position.

As shown in FIG. 1, the type of apparatus used in the prior art for holding an X-ray plate in a chosen position typically includes a pair of rails 12 which typically are mounted on a wall to extend vertically. A cassette holder 14 is mounted to the rail to slide up and down along the rail 12. Typically, the cassette holder 14 includes a lower lip or shelf 16 for supporting the cassette, and further includes a clamp 18 which is urged against the top of the cassette to secure it. When a grid is used in front of the cassette, the lower edge of the grid rests on the shelf 16 and the top edge of the grid is held by the clamp 18.

In the operation of the prior art apparatus of FIG. 1, normally the cassette and the grid were positioned with their lower edges resting on the shelf 16 and then were clamped in position by lowering the clamp 18 to engage the upper edges of the grid and the cassette. Thereafter, the patient was moved to a position immediately in front of the grid and the cassette and the cassette holder 14 was then positioned in elevation to bring the cassette to the desired height.

At this point in the procedure, it sometimes became apparent that better coverage of the desired body portions could be obtained if the cassette were rotated 90° from its then-current position. When this was the case, it was necessary to remove the patient, to raise the clamp 18 and to remove both the cassette and the grid, to rotate the cassette and grid 90°, to re-engage the clamp 18, and to bring the patient back into proximity with the cassette and grid.

During this reorientation of the grid and of the cassette, the parts were sometimes dropped accidentally, causing breakage to the delicate grid. The grid typically cost approximately $600 to replace, and even if such breakage were relatively infrequent, the large cost of the grid made the occurrence of such accidents an expensive proposition. The present invention grew out of the necessity of reducing or eliminating the occurrence of such accidents.

FIG. 2 is a perspective view of an apparatus for holding an X-ray plate according to a preferred embodiment of the present invention. A base plate 20, typically of steel, is adapted for motion along the rails 12. An axle 22 is rigidly affixed to the base plate 20 and extends perpendicular to it in a forward direction. The cassette holder 10 of the present invention has the form of a thin box as shown in FIG. 2 which is open at one of its narrow ends 26. A hub 24 is mounted on the rear side of the cassette holder 10 and extends rearwardly therefrom. The inside diameter of the hub 24 is sufficiently large to fit snugly over the axle 22, thereby providing a rotatable mounting for the cassette holder 10 on the base plate 20. In the preferred embodiment, the hub 24 is secured to the axle 22 by the bolt 28 and the nut 30.

In use, both the cassette and the grid are inserted edgewise into the cassette holder 10, and if it becomes necessary to rotate them 90° this is accomplished easily and safely by rotating the cassette holder 10 with respect to the base plate 20.

Figure 4:
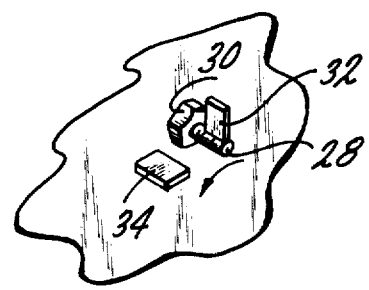
FIG. 4 is a fractional perspective view showing a device for limiting rotational motion of the cassette holder in the apparatus of FIG. 2; and, FIG. 5 is a side elevation view similar to FIG. 3 and showing an alternative embodiment of the present invention.

To assure that the cassette holder 10 is never rotated to a position which would cause the grid and the cassette to fall out of it, a system of stops is employed to limit the angular motion. In a preferred embodiment shown in FIG. 4, the bolt 28 rotates with the cassette holder 10 and is provided at its rear portion with a stop pin 32 which engages one or more stops 34 on the rear surface of the base plate 20.

In addition to the stop mechanism, an indexing mechanism is also provided in a preferred embodiment. Whereas the stop mechanism of FIG. 4 limits rotation of the cassette holder 10, the purpose of the indexing mechanism is to permit the cassette holder 10 to be conveniently rotated to exactly the desired angle, and for the cassette holder 10 to be turned to exactly the same position time after time in a dependably repeatable manner. In the present invention, the indexing mechanism includes a spring-loaded pin 36 affixed to the hub 24 and extending radially through the hub 24, and further includes a hole 38 in the axle 22, so positioned on the axle 22 that at the desired position, the spring-loaded pin 36, having been rotated to the hole 38, is urged into the hole 38.

This indexing system requires that when the cassette holder 10 is to be rotated, the spring-loaded pin 36 must first be retracted radially out of the hole 38 before the cassette holder can be rotated at all. As the cassette holder 10 is rotated from one position to another, the spring-loaded pin 36 bears against the hub 24 until it comes to the hole 38 into which it plunges to index the cassette holder at the new position. Thereafter, if the cassette holder 10 is to be moved again to the previous position, it is necessary to manually retract the spring-loaded pin 36 from the hole 38.

Figure 3:
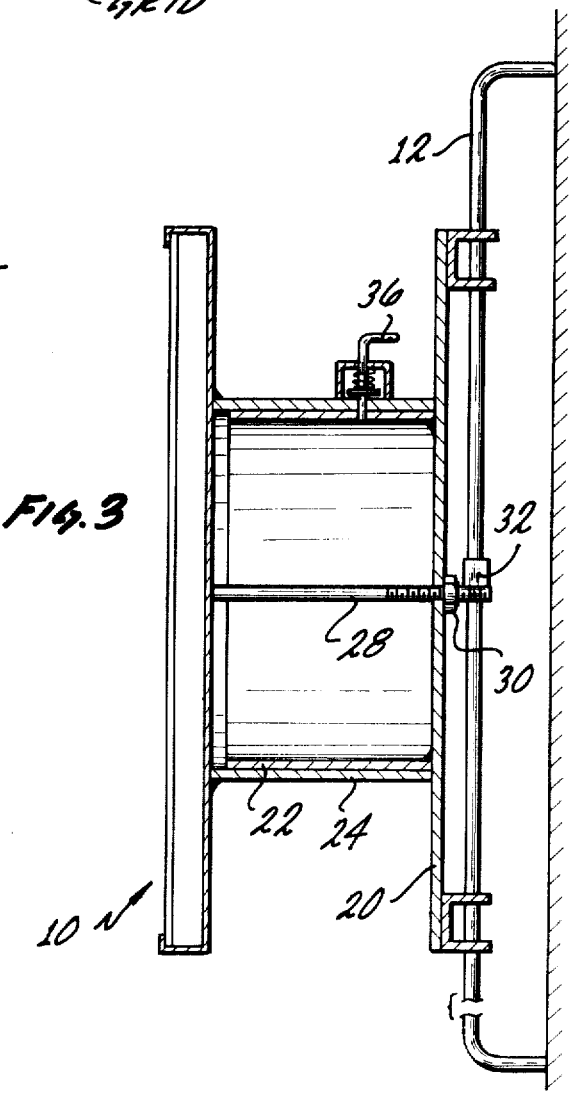
FIG. 3 is a side elevation view of the apparatus shown in FIG. 2.

FIG. 3 is a side elevation view of the apparatus of FIG. 2 and shows the manner in which the cassette holder 10 is mounted to the base plate 20.

FIG. 5 is a side elevation view comparable to that of FIG. 3 but showing an alternative technique for mounting the cassette holder 10 to the base plate 20. In the embodiment shown in FIG. 5, the hub 24' is affixed to the rear side of the cassette holder 10 while the axle 22' is affixed to the front side of the base plate 20.

As shown in FIG. 2, the cassette holder 10 is provided with a push rod to facilitate removal of the cassette and of the grid from the cassette holder. The push rod is mounted on the narrow edge of the cassette holder opposite the open end 26 and extends through a hole in the wall of the cassette holder so that the operator can push the push rod 40 into the cassette holder 10 to push the cassette and grid out through the open end 26 of the cassette holder.

Thus, there has been described an improved apparatus for holding an X-ray plate in a chosen position. The apparatus disclosed in specifically adapted to avoid the necessity of removing the grid and the cassette from the cassette holder when the grid and cassette are to be reoriented by rotating them through 90°. In the present invention, the cassette holder is rotatably mounted on the base plate and is rotated to a new position with the grid and cassette safely retained inside of the cassette holder.

In other embodiments, other means of rotatably mounting the cassette holder 10 on the base plate are employed. For example, in one embodiment, the cassette holder 10 is simply bolted with a single bolt to the base plate 20. In another embodiment, a pin extending rearwardly from the rear surface of the cassette holder 10 moves within a slot in the base plate 20 to limit the angular motion. In a variation of this embodiment, springs mounted to the base plate 20 can provide an indexing action.

In other embodiments, the indexing action can be provided by a spring-loaded ball detent which at some point in the rotational motion is urged into a depression on the opposing members.

In an alternative embodiment, the cassette holder 10 may include grooves which extend inwardly from the inside surfaces of the narrow walls of the cassette holder to separate the grid from the cassette and to hold them in their proper relative positions.

Thus, it will be understood that the foregoing detailed description is illustrative of a preferred embodiment of the invention, but that additional embodiments will be obvious to those skilled in the art. The embodiments described herein, together with those additional embodiments are considered to be within the scope of the invention.

What is claimed is:

1. In apparatus for supporting an X-ray film cassette and associated grid in a predetermined position in a vertical plane for exposure, said film cassette and grid being oblong, rectangular and coextensive in shape, means forming a pair of upstanding rails supported in spaced, parallel, vertically extending positions, means forming a carriage slideably disposed on said rails for movement between selected vertically spaced locations thereon, holder means connected to said carriage and including lip means constructed and arranged for gripping and supporting said cassette and grid on three sides thereof so that motion of said grid and cassette is arrested and caused to lie in predetermined vertically oriented planes with respect to each other and in contiguous relation as a unitary structure in coextensive relation to each other, mounting means interconnected between said holder means and said carriage and including a first cylindrical shell extending forwardly from such carriage and towards said holder means to form an axle and a second cylindrical shell forming a hub fixed to and extending rearwardly from said holder means and toward said carriage to form a hub and thereby define an axle-hub pair lying between said carriage and holder means, said cylindrical shells being dimensioned to nest with each other for smooth rotational movement therebetween for supporting said holder means in fixed vertical and horizontal position relative to said carriage, rotatable means interconnecting said carriage and holder means in an axial direction and constructured and arranged for permitting rotational movement between said axial hub pair about a substantially horizontal axis normal to the planes of said cassette and grid while retaining the holder means in otherwise fixed relative position with respect to said carriage thereby allow rotational reorientation of said grid film cassette and holder while said grid and film cassette remain supported as a unitary structure within the holder, stop means interconnected between the carriage and the holder means for limiting the angle of rotation of the cassette holder means to 90° such that the film cassette and grid can be oriented either with their long dimension aligned in a vertical or horizontal direction the opening of said lip means being arranged with said stop means so that it faces either upwardly or horizontally to thereby restrain any movement of said film cassette and grid due to the action of gravity, and index means associated with said hub and axle pair for selectively interlocking the same together at the limits of rotational travel established by said stop means.

* * * * *